US012409574B2

(12) United States Patent
Blatter et al.

(10) Patent No.: US 12,409,574 B2
(45) Date of Patent: Sep. 9, 2025

(54) RAZOR CARTRIDGE

(71) Applicant: Edgewell Personal Care Brands, LLC, Chesterfield, MO (US)

(72) Inventors: Alan Blatter, Sandy Hook, CT (US); James Chasen, West Haven, CT (US); Christopher Fernald, Fairfield, CT (US)

(73) Assignee: Edgewell Personal Care Brands, LLC, Chesterfield, MO (US)

( * ) Notice: Subject to any disclaimer, the term of this patent is extended or adjusted under 35 U.S.C. 154(b) by 203 days.

(21) Appl. No.: 18/550,199

(22) PCT Filed: Mar. 7, 2022

(86) PCT No.: PCT/US2022/019118

§ 371 (c)(1),
(2) Date: Sep. 12, 2023

(87) PCT Pub. No.: WO2022/192127

PCT Pub. Date: Sep. 15, 2022

(65) Prior Publication Data

US 2024/0157591 A1 May 16, 2024

Related U.S. Application Data

(60) Provisional application No. 63/160,029, filed on Mar. 12, 2021.

(51) Int. Cl.
*B26B 21/40* (2006.01)

(52) U.S. Cl.
CPC ...... *B26B 21/4018* (2013.01); *B26B 21/4031* (2013.01); *B26B 21/4037* (2013.01)

(58) Field of Classification Search
CPC ............ B26B 21/4018; B26B 21/4031; B26B 21/4037
See application file for complete search history.

(56) References Cited

U.S. PATENT DOCUMENTS 5,369,885 A * 12/1994 Ferraro ............... B26B 21/4012 30/41
2003/0159291 A1* 8/2003 Clark .................. B26B 21/4068 30/41
(Continued)

FOREIGN PATENT DOCUMENTS

EP 3689559 A1 8/2020
WO 199411163 A 5/1994
(Continued)

OTHER PUBLICATIONS

International Search Report mailed on Jun. 15, 2022, by the International Searching Authority for International Application No. PCT/US2022/019118.
(Continued)

*Primary Examiner* — Omar Flores Sanchez
(74) *Attorney, Agent, or Firm* — Edgar Rodriguez

(57) ABSTRACT

A razor cartridge has a housing with a blade mounting region between a guard and a cap. A first, second and third razor blade are sequentially mounted in the blade mounting region. An over-guard is secured over the blades. The cutting edges of the blades have an as-defined increased sharpness. The blades are mounted at a reduced angle between each blade portion bearing the cutting edge and a reference plane tangential to the cutting edges of the first and third blade. Individual longitudinal members of the over-guard that lie over each blade and have a progressively decreasing height above the reference plane in a front to back direction of the razor cartridge. A further longitudinal member is forward of the first blade and has a height above the reference plane.

10 Claims, 4 Drawing Sheets

(56) References Cited

U.S. PATENT DOCUMENTS

| | | | | |
|---|---|---|---|---|
| 2012/0317818 | A1* | 12/2012 | Oglesby | B26B 21/4018 30/77 |
| 2012/0324737 | A1* | 12/2012 | Howell | B26B 21/4018 30/50 |
| 2017/0197322 | A1* | 7/2017 | Drori | B26B 21/42 |
| 2019/0047164 | A1* | 2/2019 | Lee | B26B 21/4043 |
| 2019/0255720 | A1* | 8/2019 | Galanis | B26B 21/4037 |
| 2019/0270210 | A1* | 9/2019 | Coresh | B29C 66/30321 |
| 2020/0031006 | A1* | 1/2020 | Kim | B26B 21/4031 |
| 2020/0338770 | A1* | 10/2020 | Moustakas | B26B 21/4031 |
| 2020/0398449 | A1* | 12/2020 | Claus | B26B 21/565 |
| 2021/0016458 | A1* | 1/2021 | Peterson | B26B 21/4012 |
| 2021/0031389 | A1* | 2/2021 | Bozikis | B26B 21/565 |

FOREIGN PATENT DOCUMENTS

| | | | |
|---|---|---|---|
| WO | 199735693 | A2 | 10/1997 |
| WO | 2010039749 | A1 | 4/2010 |
| WO | 2018019951 | A1 | 2/2018 |

OTHER PUBLICATIONS

Written Opinion mailed on Jun. 15, 2022, by the International Searching Authority for International Application No. PCT/US2022/019118.

* cited by examiner

RAZOR CARTRIDGE

CROSS REFERENCE TO RELATED APPLICATIONS

This application claims priority to International Application No. PCT/US2022/019118, filed on Mar. 7, 2022, which claims priority to U.S. Provisional Patent Application No. 63/160,029, filed Mar. 12, 2021, the contents of which are incorporated herein for reference in their entireties.

BACKGROUND

1. Technical Field

The present disclosure relates to safety razors in general and, more particularly, to a razor cartridge having a protective over-guard.

2. Background

Some shavers suffer from skin conditions such as pseudofolliculitis barbae (PFB) and acne. These users would like to be able to shave successfully without irritation(s) or worsening their pre-existing conditions. Some other users prefer an appearance of having a permanent "5 o'clock shadow" and would like to be able to shave to maintain this look.

SUMMARY

The present disclosure has for its objective to substantially alleviate the limitations of the prior art razor cartridges by providing a razor cartridge having an over-guard. The razor cartridge has a housing with a guard at a front region of the housing, a cap at a rear region of the housing, and opposed end walls connecting the guard and the cap. The housing defines a blade mounting region between the guard and the cap. A first, second and third razor blade are sequentially mounted in the blade mounting region with the first blade closest the guard, and each razor blade having a cutting edge. A reference plane is tangential to the cutting edge of the first razor blade and the cutting edge of the third razor blade, and each blade body portion bearing the cutting edge being at an angle to the reference plane. An over-guard is secured over the blades and includes a first longitudinal member in advance of the first blade, and a second, third and fourth longitudinal member lying respectively over the first, second and third razor blades. Each first, second, third and fourth longitudinal member has a respective height above the reference plane.

In some aspects the over-guard has front to back extending slots in the first, second and third longitudinal member. In some aspects of this aspect the slots are aligned in a front to back direction of the razor cartridge. In other aspects the slots can be omitted.

In some aspects the over-guard further has a front to back cross rib extending from the first member to the fourth member.

In some aspects the cutting edges of each razor blade have a cut-force sharpness, as defined herein in a range about 5-6.5 N.

In some aspects the angle between the blade body portions bearing the cutting edges and the reference plane is 20.5 degrees.

In some aspects the heights of the second third and fourth members above the reference plane progressively decrease in a front to back direction of the razor cartridge. In some aspects the height of the second member above the reference plane is in a range about 0.287 to 0.212 mm. The height of the third member above the reference plane is in a range about 0.150 to 0.129 mm. The height of the fourth member above the reference plane is about 0.039 mm. The height of the first longitudinal member above the reference plane is equivalent to the height of the second longitudinal member above the reference plane (200).

The razor cartridge in use in a defined manner will not provide a typical "close" shave but will provide adequate comfort. The above features and advantages will be more fully understood with reference to the following detailed description when taken in conjunction with the accompanying drawings.

DETAILED DESCRIPTION

Figure 1:
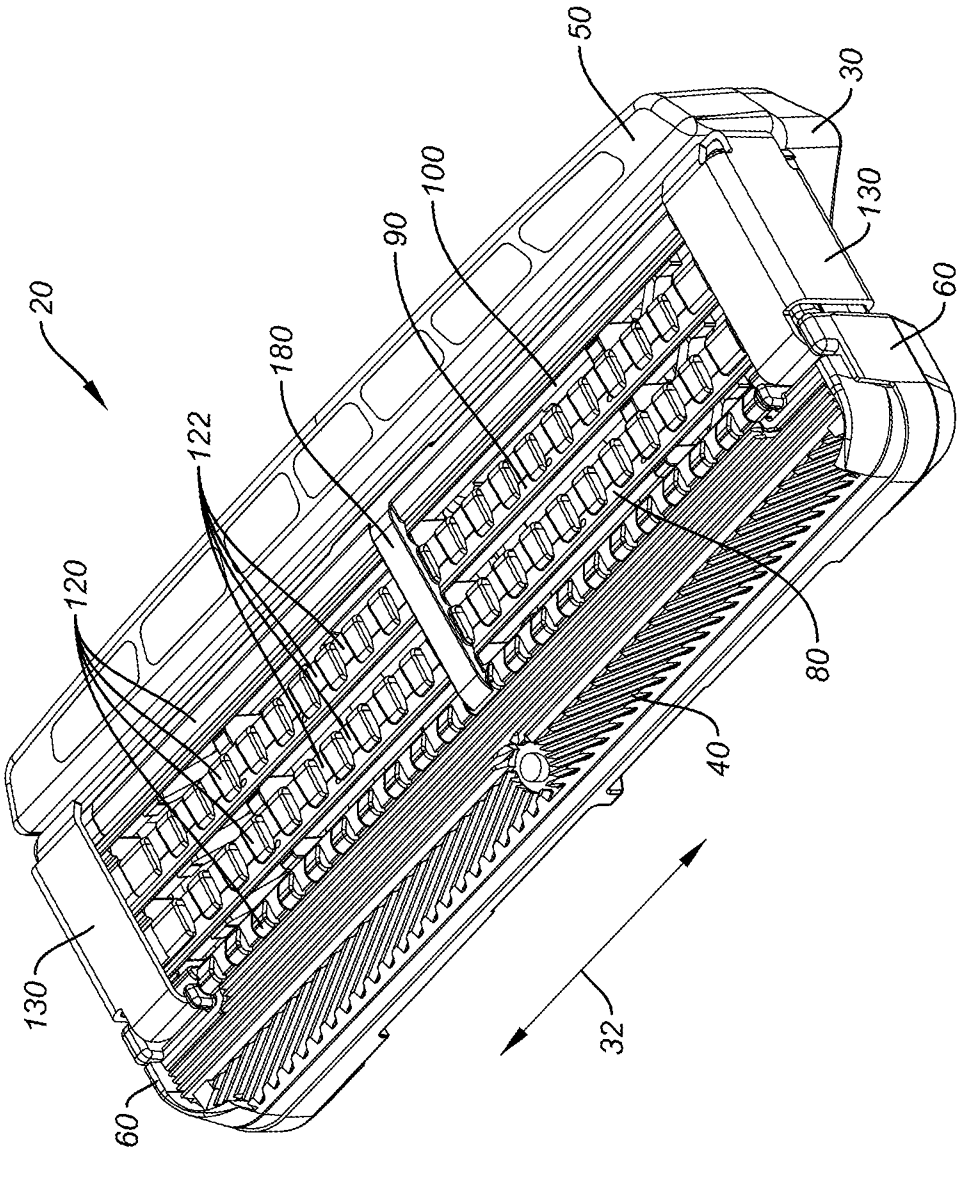
FIG. 1 is an upper perspective view of a razor cartridge of the present disclosure.

Referring now to the drawings and in particular FIG. 1, a razor cartridge 20 is depicted. The cartridge 20 has a housing 30 with a guard 40 at a front region of the housing 30 and a cap 50 at a rear region of the housing 30. The guard 40 can optionally be provided with skin-engaging fins, as depicted, e.g. elastomeric fins. In the context of the present disclosure the terms front, forward, leading etc., and rear, aft, trailing etc. are used relative to a direction of motion of the razor cartridge 20 in use. The term longitudinal is used relative to an elongated direction 32 of the housing. The housing has opposed end walls 60 connecting the guard 40 and cap 50. The housing defines a blade mounting region 70 (see FIG. 2) between the guard 40 and the cap 50. A first razor blade 80, closest the guard 40, a second, immediately trailing razor blade 90, and a third rearmost razor blade 100 are mounted in the blade mounting region 70. Each razor blade 80, 90, 100 has a respective cutting edge 82, 92, 102 (see FIGS. 2 & 3). Three razor blades 80, 90, 100 are described as being mounted in the cartridge 20 of the present disclosure however this quantity should not be limiting and fewer (e.g. two) or more (e.g. four, five etc) razor blades can usefully be employed. An over-guard 120, being a separate component part of the assembly of the cartridge 20 is positioned over the blades 80, 90, 100. A retainer 130, e.g. one or more aluminum clips, is formed around the housing 30 to retain the blades 80, 90, 100 and over-guard 120 to the housing 30. In the embodiment depicted in FIG. 1 certain elements of the over-guard 120 are provided with hair-aligning slots 122 in the skin-engaging surfaced. The slots 122 can have a width 0.8 mm, a depth 0.52 mm deep, and a pitch 1.6 mm. The slots 122 can be aligned in a front to back direction of the cartridge 20, or can be offset.

The housing 30 is manufactured by injection molding a suitable thermoplastic polymer. For example, the housing 30 can be formed from ABS (acrylonitrile butadiene styrene) for benefits of chemical resistance (to substances typically found in use), impact resistance, and dimensional stability.

The over-guard is manufactured from a material having a tensile modulus 1.4-210 GPa. For example, the over-guard 120 can be injection molded ABS or POM. The over-guard 120 can be die-cast zinc alloy. The over-guard 120 can be (stainless) steel, e.g. formed in a perforation tool, or can be particulate stainless steel that is sintered to provide a solid body.

Figure 2:
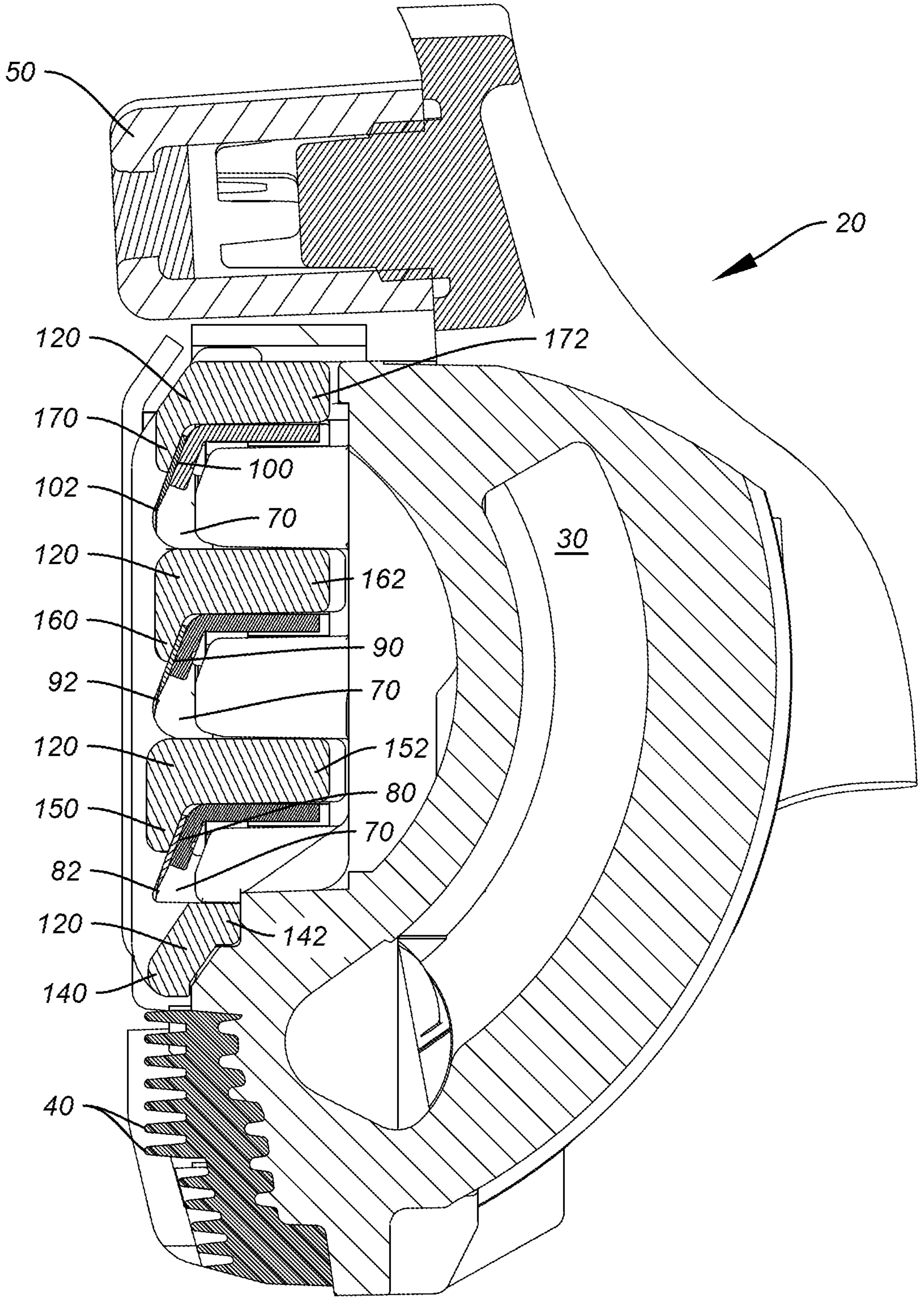
FIG. 2 is a transverse sectional view of the cartridge.

Referring now to FIG. 2, a transverse cross section of the cartridge 20 is depicted. The over-guard 120 for a three-blade cartridge 20 comprises essentially four longitudinally extending members. A first member 140 is in advance of the first blade 80 and has a leg 142 providing structural (stiffness) benefits. Members 150, 160, 170 lie respectively over the three blades 80, 90, 100, and have respective legs 152, 162, 172 also for structural (stiffness) benefits. Referring back to FIG. 1, the over-guard 120 is provided with a front to back cross rib 180, extending from member 140 to member 170 for further structural stability benefits.

Figure 4:
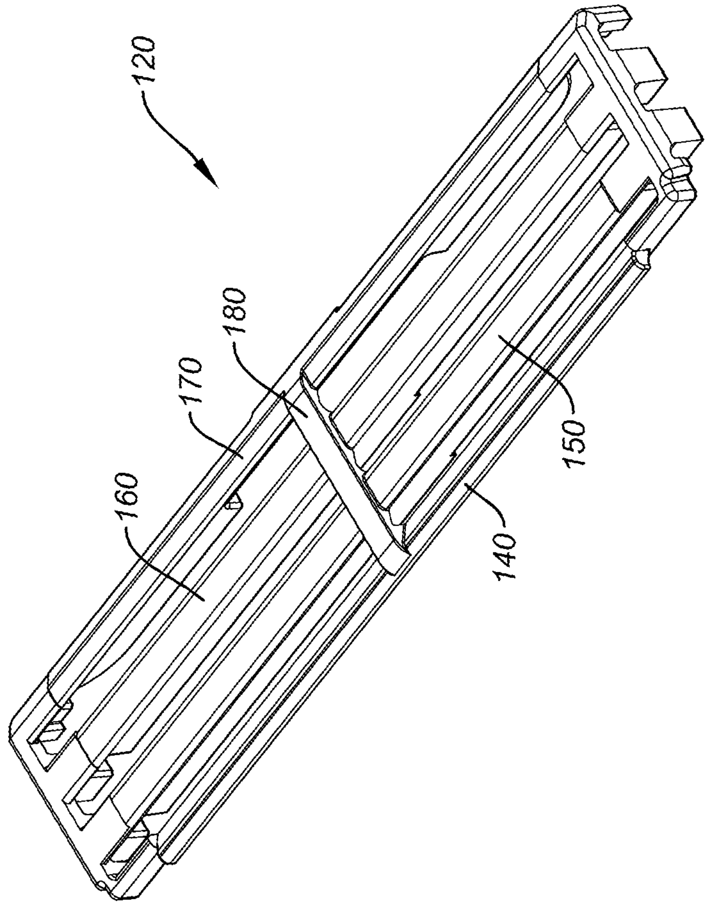
FIG. 4 is a perspective view of another over-guard of the present disclosure.

In FIG. 4 another over-guard 120 is depicted, omitting the slots 122 of FIG. 1. In this FIG. it can be seen that all four longitudinally extending members are interconnected at opposed elongated ends of the over-guard 120.

Figure 3:
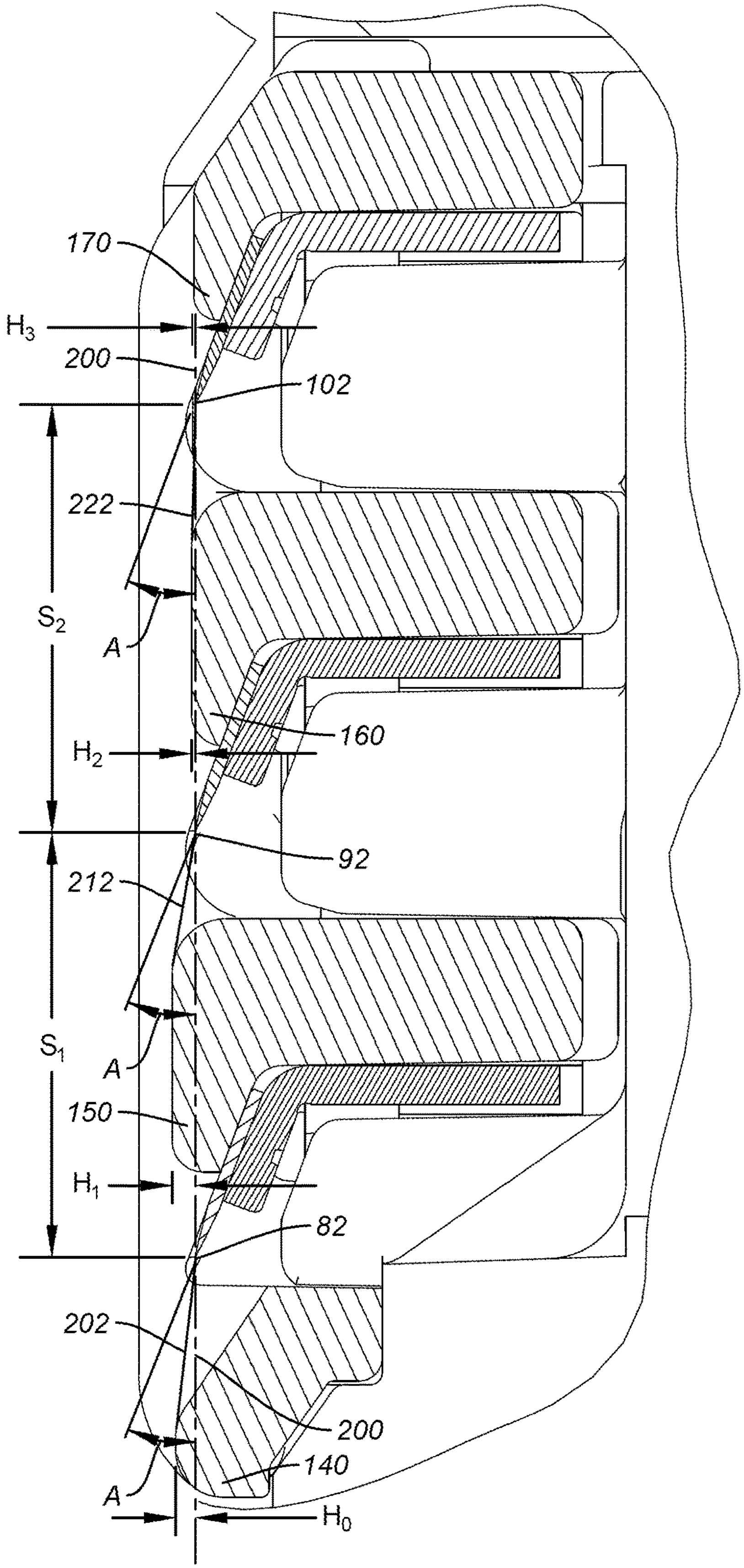
FIG. 3 is a detailed portion of FIG. 2.

Referring now to FIG. 3, a detailed portion of FIG. 2 is depicted. A reference plane 200 is tangential to the cutting edges 82, 102 of the first and last (e.g. third) blades 80, 100. The plane 200 can also be tangential to the cutting edge 92 of the other (e.g. second) blade(s) 90, especially in embodiments where the razor cartridge has two blades. The blade cutting edges are spaced apart by a span dimension along plane 200 by spans S1, S2 equal to 2.72 mm. Each blade cutting edge 82, 92, 102 is spaced from the respective immediately next-forward longitudinal member 140, 150, 160 by a distance 202, 212, 222 respectively in a range 0.8-0.9 mm. The distances 202, 212, 222 being measured from the respective cutting edge to the next-forward skin engaging tangent point of the over-guard 120. The longitudinal members 150, 160, 170 have a height H1, H2, H3 respectively from the upper respective skin engaging surface to the reference plane 200. The first longitudinal member 140 has a height from the upper skin engaging surface to the reference plane 200 that is equivalent to height H1. The blades 80, 90, 100 are each positioned such that the blade body portion bearing the cutting edge is at an angle A having a value about 20.5 degrees (e.g. in a range 19 to 21.5 degrees) to the reference plane 200. The angle A can be defined between the reference plane 200 and one (i.e. upper or lower) outer surface of the blade body portion, or can be defined (as shown) between the reference plane 200 and a notional center plane of the blade body portion. This value is slightly lower than the angle found in many typical modern wet shaving cartridges, which can be in a range 22-28 degrees, and has been found beneficial when used in the present device in conjunction with blade cutting edges having increased sharpness, as described below.

The cutting edges 82, 92, 102 of the blades 80, 90, 100 can have conventional sharpness, as generally found in typical modern wet shaving cartridges, i.e. about 7-14 N, with a median value about 10-10.5 N as measured in a cut force test, as described below. More preferably the blades have increased sharpness, e.g. about 5-6.5 N. In the cut force test the blades are cut perpendicularly (relative to the medium being cut) 15 times into fully water saturated WHATMAN cellulose chromatography paper, having thickness 0.9 mm and width 25.4 mm. The cutting speed is 15 mm/min and cutting depth into the paper is 0.8 mm. The above-mentioned sharpness cut force is the average plateau force from cut no. 7 to cut no. 9.

In experimental arrangements, cartridges having the following heights H1, H2, H3 were evaluated:

| | H1 (mm) | H2 (mm) | H3 (mm) |
|---|---|---|---|
| Example 1 | 0.287 | 0.212 | 0.116 |
| Example 2 | 0.150 | 0.129 | 0.069 |
| Example 3 | 0.039 | 0.039 | 0.037 |

The values of H1, H2, H3 progressively decrease in a front to back direction of the cartridge. In controlled shaving test, the Applicants of the present disclosure have found the combination of "sharper" blade cutting edges, plus "reduced" blade body to reference plane angles, plus greater over-guard longitudinal member heights above a reference plane (e.g. of examples 2, and 1) provide benefits to sufferers of PFB, and also provide controlled beard length trimming for a permanent "5 o'clock shadow" appearance for the user.

While various embodiments have been described above it should be understood that they have been presented by way of example only, and not limitation. For instance, modifications or changes as can be made within the scope of the attached claims and features disclosed in connection with any one embodiment can be used alone or in combination with each feature of the respective other embodiments. Thus, the breadth and scope of any embodiment should not be limited by any of the above-described exemplary embodiments but should be defined only in accordance with the following claims and their equivalents.

What is claimed is:

1. A razor cartridge, comprising:

a housing having a guard at a front region of the housing, a cap at a rear region of the housing, and opposed end walls connecting the guard and the cap, the housing defining a blade mounting region between the guard and the cap;

a first razor blade closest to the guard, a next-adjacent second razor blade, and a last third razor blade mounted in the blade mounting region, each having a respective cutting edge having a sharpness;

a reference plane tangential to the cutting edge of the first razor blade and the cutting edge of the third razor blade, each blade body portion bearing the cutting edge being at an angle to the reference plane;

an over-guard secured over the razor blades and including a first longitudinal member in advance of the first razor blade, and a second a third and a fourth longitudinal member lying respectively over the razor blades, each second, third and fourth members having a respective height above the reference plane.

2. The razor cartridge of claim 1, wherein the over-guard has front to back extending slots in the first, second and third member.

3. The razor cartridge of claim 1, wherein the over-guard further includes a front to back cross rib, extending from the first member to the fourth member.

4. The razor cartridge of claim 1, wherein the cutting edge of each razor blade has a cut-force sharpness in a range of about 5-6.5 N.

5. The razor cartridge of claim 1, wherein the angle is about 20.5 degrees.

6. The razor cartridge of claim 1, wherein each height progressively decrease in a front to back direction of the razor cartridge.

7. The razor cartridge of claim 1, wherein the height of the second member is in a range about 0.287 to 0.212 mm.

8. The razor cartridge of claim 1, wherein the height of the third member is in a range about 0.150 to 0.129 mm.

9. The razor cartridge of claim 1, wherein the height of the fourth member above is about 0.039 mm.

10. The razor cartridge of claim 1, wherein the height of the first member is equivalent to the height of the second member.

* * * * *